United States Patent

[11] 3,630,371

| [72] | Inventor | Jiri Hrdina<br>Prague, Czechoslovakia |
| --- | --- | --- |
| [21] | Appl. No. | 849,585 |
| [22] | Filed | Aug. 4, 1969 |
| [45] | Patented | Dec. 28, 1971 |
| [73] | Assignee | Ceskoslovenska akademie ved<br>Prague, Czechoslovakia |
| [32] | Priority | Nov. 6, 1964 |
| [33] | | Czechoslovakia |
| [31] | | 6171-64 |
| | | Continuation of application Ser. No. 498,034, Oct. 19, 1965, now abandoned. This application Aug. 4, 1969, Ser. No. 849,585 |

[54] VALVE MEANS FOR CHROMATOGRAPHIC APPARATUS
3 Claims, 12 Drawing Figs.

[52] U.S. Cl. ............................................ 210/198,
210/278, 23/232 C, 55/67, 55/197, 55/386, 73/422 GC
[51] Int. Cl. ....................................... B01d 15/08

[50] Field of Search ............................................. 73/61.1 C,
422 GC, 23.1; 141/1, 18, 21, 25, 26; 55/386, 197,
67; 23/230, 253, 254, 256, 332 C; 210/31, 31 C,
198 C, 278

[56] References Cited
UNITED STATES PATENTS
3,156,548  11/1964  Perry ........................... 73/23.1 X

*Primary Examiner*—Laverne D. Geiger
*Assistant Examiner*—Edward J. Earls
*Attorney*—Paul H. Smolka ABSTRACT: Chromatographic apparatus including valve means for controlling flow through the apparatus. The valve means connects the carrier liquid, the sample liquid, the column and the pump and includes a housing with a rotary core. Passages are provided in the housing. These passages communicate with the various components of the apparatus. The rotary core of the valve includes passages communicating between pairs of passages in the housing. By selectively rotating the core from one position to another communication between the housing passages can be altered to provide the desired flow paths.

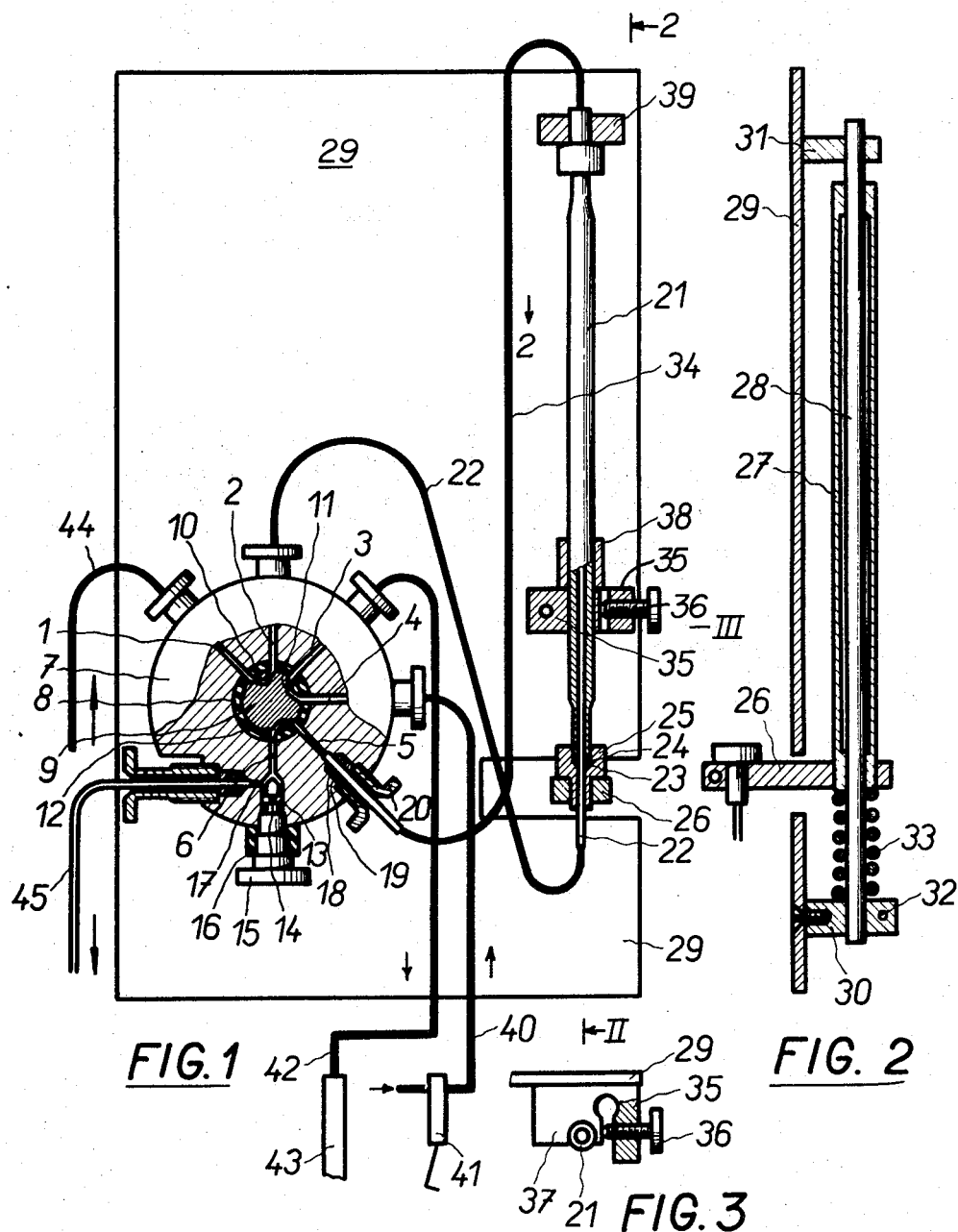

JIŘÍ HRDINA INVENTOR.
BY Paul H. Smolka
HIS ATTORNEY

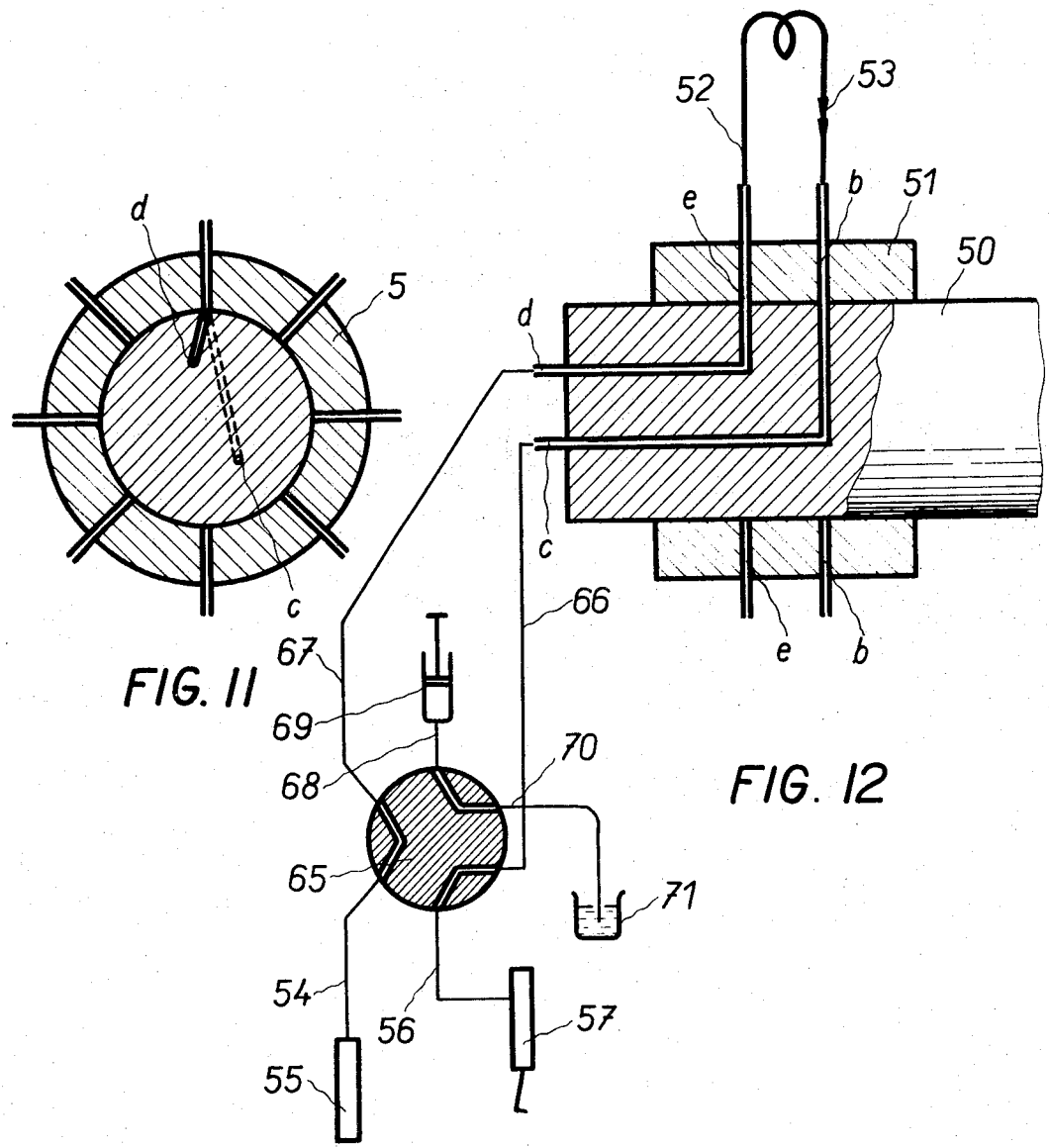

VALVE MEANS FOR CHROMATOGRAPHIC APPARATUS

This application is a continuation of application Ser. No. 498,034, filed Oct. 19, 1965, now abandoned.

The subject of this invention relates to apparatus for transferring samples to be analyzed on the chromatographic columns from one or more reservoirs through capillary tubing in the form of connectable or unconnectable loops, by conveniently being connected into the discharge tubing of the columns.

It is necessary in the known chromatographic processes to transfer the particular samples from the reservoirs in which the samples are placed in advance. This is especially difficult with new designs of columns in which there is inadequate space over the chromatographic column. As a result, the sharpness of the resulting separation of said samples is substantially influenced by delivering the sample from the reservoir on the column. For that reason it seems advantageous that the sample should be placed in the reservoir in such a way that it could be transferred by a pump into the closure of the column at the beginning of the chromatographic analysis, by the shortest possible way by means of capillary connections. It is, therefore, necessary to switch into discharge tubing, whereby the particular buffers are delivered from the corresponding pump to the column. A reservoir in the shape of a loop is principally used in gas chromatography. Usually, the loop is connected during a convenient time interval into the circuit with the discharge tubing leading to the column.

The object of this invention relates to apparatus enabling the dosing not only of particular samples, but also of sets of samples following each other, if possible in full automatic operation. The apparatus according to the invention has its specific advantages just for these very reasons by using the known principle of inserting samples temporarily stored in a capillary loop of tubing. The use of the apparatus according to the invention is very universal so that the advantages are readily apparent. Thus it is possible to perform successive analyses from one particular sample even by using the same loop in accordance with this invention, or to introduce various samples from the same loop, with the samples being separated by buffers or by bubble pistons, in accordance with conventional practice. Operation of the apparatus as just mentioned can be accomplished using one particular loop of capillary tubing which remains permanently connected to a multiway valve for effecting switching. In this way more loops can be successively filled up and emptied and successively connected to the liquid flow leading to the column.

There may be a single one or a set of them which, can be connected in a manner which enables the filling up with a minimum amount of the sample. Also a sample can be placed in each reservoir without the need of its separation from the fluid medium by means of bubble pistons.

It is possible to fill the reservoir loops by applying suction to the tubing, so that the rate of the flow can be adjusted, or said filling up can be performed by means of special sucking means included in the apparatus, guaranteeing the sucking in of prefixed volumes of samples, such sucking means being capable of sucking in of predetermined fixed volumes of samples, and a plurality of such volumes can be separated by means of bubble pistons and preserving buffers.

The attached drawings illustrate the subject of the invention.

FIG. 1 is an elevational frontal view, partly in section, of my new apparatus comprising one loop reservoir;

FIG. 2 is a side view thereof in the direction of arrows II—II in FIG. 1;

FIG. 3 is a broken section along line III—III of FIG. 1;

FIG. 11 is a cross-sectional view of the distributing arrangement in respect to the particular loop reservoirs, and FIG. 12 shows a longitudinal section thereof.

Figure 4:
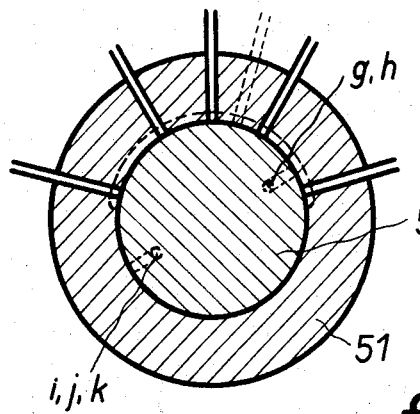
FIG. 4 shows in cross section a distributing arrangement for a plurality, i.e., five, loop reservoirs.

An advantageous embodiment of the invention provided with a single loop or reservoir, is schematically shown in FIGS. 1 and 2. The hydraulic communications in the assembly are accomplished by the radial passages 1, 2, 3, 4, 5, and 6, drilled in the cylindrical valve body 7. The spaced radial passages pass through a thin packing 8, made, e.g., of P.T.F.E., and seal the spindle 9 which is rotatable in both directions. The spindle 9 contains three substantially U-shaped connecting passages 10, 11, and 12, which can interchangeably link said radial passages 1 to 6. The passage 6 leads into the wider boring 13, in which a control screw 15 moves tightly with its shoulder 14. The screw 15 enables an operator to control or even to completely shut off the connection between the channel 6 and the space between the boring 13 and the end part of the control screw 15. FIG. 1 shows also how the needed tightening of the control screw 15 can be achieved when the same is turned by the flexible packing 16, which seals the screw 15 in the valve body 7 even if turned. In this case the sealing shoulder 14 can be omitted. Into the space of the boring 13 associated with the radial passage 6 leads sideways a passage 17, to which connects the outer capillary tubing 45 in the same manner as the other outer capillary tubings to radial passages 1 to 5. As advantageous sealing is shown in detail in the passage 5. The sealing is achieved by means of a small packing ring 18, through which passes the outer capillary tubing 34, connected to the channel 5; the pressure needed for a perfect sealing even under prevailing increased pressures is effected upon the seal 18 over the metal washer 19 by tightening the screw 20. The sealing connection may of course be made in other known manner.

In the simplest case a continuous loop for receiving the samples forms a capillary tube connected to the passages 2 and 5; when such continuous capillary tube is particularly long, it may be coiled in one or more turns lying on the outer side of the valve body 7. This however is not shown in FIG. 1. FIG. 1 shows a loop 22 directly permitting sucking into a capillary tube 21, possibly of glass which simultaneously forms the reservoir; its lower end, advantageously tapered, is detachable from the capillary connection 22 with the passage 2 and thus it would be possible to dip the free lower end of the capillary tube 21 below the liquid level of a receptacle containing even a quite small amount of sample to be sucked into the capillary tube 21.

An easy dismantable and simultaneously perfectly tight connection of said lower end of the capillary tube 21 with the loop connection 22 is shown in FIGS. 1 and 2. Between the funneled end of capillary loop connection 22 and the lower end of capillary tube 21 is inserted a small packing 24, e.g., made of silicone rubber, whereby said packing together with capillary loop connection 22 are tightly inserted into the bushing 25, situated in the support 26. Said support 26 is firmly connected to the tubing 27, slidably arranged on the guiding rod 28, situated on the other side of the basic carrying board 29. On the front side of the said board is situated the capillary tube 21 and the valve body 7. On the rear side of the said board is fixed the guiding rod 28, e.g., by means of a pair of fittings 30, 31. Said fittings are in the shape of cantilevers screwed to the ground board 29, and one of the said cantilevers can split to clamp the bar 28 by tightening of the screw 32. The spring 33 presses upwards against the support 26 and, produces sufficient sealing pressure on the packing 24. The loosening of the connection can be easily carried out manually so that the bushing 25 or the support 26 are drawn downwards against the force of the spring 33, then turned sideways by turning around the guiding rod 28 as far as it is allowed by the opening in the board 29.

In a similar way can be executed the tight joining of the loop connection 34 between the upper end of the capillary tube 21 and the passage 5. A permanent sealing pressure is achieved, e.g., by means of the fitting 35 securing the lower end of the capillary tube 21 (e.g., by means of tightening of the manual screw 36 on the jaw 37, resulting from a recess in the fitting 35), said fitting 35 produces simultaneously pressure in the upwards direction on the capillary tube 21 by means of another fitting 38, which can be bound to it. The pressure needed may be achieved by buckling the capillary tube 21, produced by suitable tightening of a sleeve 35, or of the upper cantilever 39, both of which are mounted on the carrying board 29. The sleeve 38 can be slit like the sleeve 35 shown in FIG. 2 so that it does not hinder the observation of levels and menisci in the capillary tube 21.

The capillary tube 21, especially when longer to receive more samples, can have U, S, or even more complicated shapes.

The apparatus operates in the following manner:

The valve spindle 9 in the position shown in the FIG. 1, connects the U-shaped connecting passage 11 directly to the tubing 40 leading from the pump 41 and to the capillary tubing 42, leading to the column 43. The connecting channel 10 connects simultaneously the passages 1 and 2, through which the connection of the lower end of capillary tube 21 with the outer capillary tube 44 is achieved by means of loop connection 22; said capillary tube 44 can serve as a syringe for sucking in of the sample. The upper end of the capillary tube 21 is connected by the capillary loop 34 and by passage 5 to the passage 6 by means of a third connecting channel 12 in the valve spindle 9. With the passage 6 is connected the sucking tubing 45, possibly over hydraulic braking means such as control or closing valve, means formed by the control screw 15, whose delicate tightening permits full control that is either shutting off, or controllable opening. If the sucking equipment, able to suck in the precise volumes of particular samples, and bubble pistons, is used the said hydraulic braking means can be omitted and the passage 6 is then connected to the sucking tubing 45 similarly as the outer capillary tubings are connected to the particular passages 1 to 5.

Transferring of the sample, either single or with the parts of preserving buffers, is carried out by turning the plug valve spindle 9 over one spacing between the passages 1 to 6. Thus, the direct connection between the tubings 40 and 42 is broken up and between the said tubings is inserted the loop leading from the tubing 40 and passage 4 to passage 5 and further over capillary loop 34, capillary tubing 21 and joint 22 to the passage 2. The same is then connected in the turned valve spindle with the passage 3, to which the capillary tube 42 leading into column 43 is connected.

If the capillary tube 21 or loop 34 contains one sample only, the change in connecting a loop can last an arbitrarily long time period. At the beginning of such period, the whole content of the loop 34 and of capillary tube 21 is extruded and washed out by means of another eluent flowing this way during the whole period of the rearrangement of the hydraulic switch means in the valve body 7.

If successive transfer of a plurality of samples is desired, said samples are mutually separated in the manner mentioned above, and besides the period of rearrangement of the hydraulic switch means must precisely correspond, while the pump 41 performs a certain number of discharge strokes, with the time interval needed to push out from the capillary tube 21 only one sample together with certain parts of the protective buffer, proceeding and following it.

Other alterations of the transferring apparatus, equipped with more reservoirs or loops, can be seen in the examples schematically shown in other figures.

Figure 5:
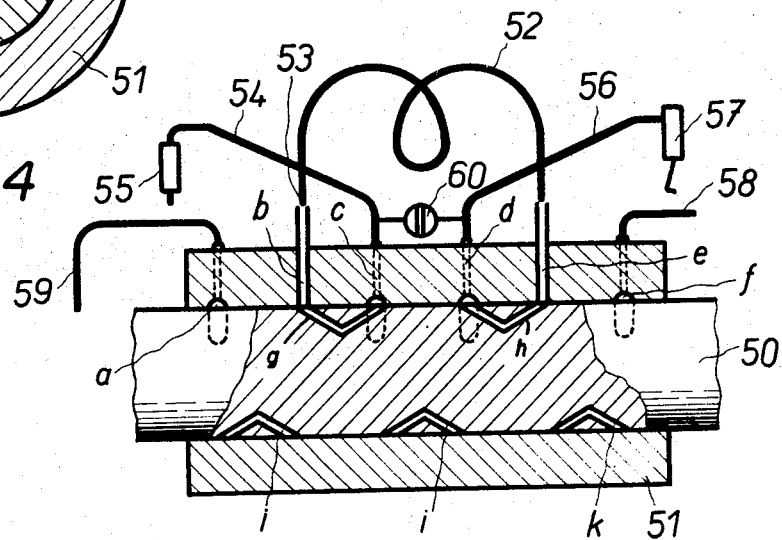
FIGS. 5 and 6 show in longitudinal sectional views two different embodiments of the control valve usable with the distributing arrangement of FIG. 4.
Figure 7:
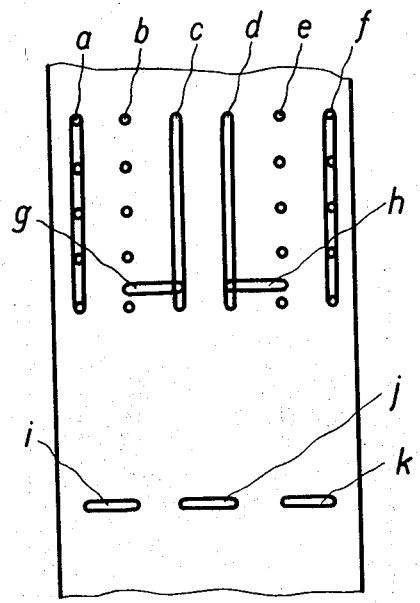
FIG. 7 is a developed view of the contacting surface of the components in the arrangement of FIG. 4.

Thus, valve means for connecting five loops successively following each other, or their filling by direct connection of the discharge branch 40 of the pump 41 with the column 43 is schematically shown in cross section in FIG. 4, in longitudinal section in FIG. 5, and in FIG. 7 in a developed view of the contacting wall between the rotatable valve spindle 50 and the solid outer valve body 51. The body 51 contains six rows of holes, respectively grooves, shown as $a, b, c, d, e, f$, in FIG. 5, said elements appearing on one half of the circumferential surface of the contacting cylindrical part as many times as are loops to be connected, namely five according to the FIGS. 4 and 7. The holes in rows $b$ and $e$ of FIG. 7 are exit holes separated from each other each of which leads to the beginning and end of the loop 52 in the detachable or undetachable manner, shown symbolically in the point marked 53.

On the other hand, the connections marked in FIG. 7 as $c$ and $d$, are carried out either like grooves on the inner sealing surface of the body 51 and lead to the outside by one passage only, which connects the groove $c$ to the capillary tubing 54 leading to the column 55, while groove $d$ connects to the discharge tubing of the pump 57. Instead of the continuous grooves $c$ and $d$ on the inner contacting surface of the body 51 aligned holes, can be connected outside of the body 51 to one of the tubings 54, 56. In the same manner the holes of the row $f$ can be connected on the inner contacting surface of the body 51 by means of a groove, and led outward by one passage only, discharging in to the tubing 58, which leads to the not shown suction equipment similar to tubing 45 shown in FIG. 1; alternately the passages $f$ can be led outward independently to allow the tubing 58 to be successively connected on particular outlets driving the sucking into the individual loops. The same is the case with the holes of the row $a$, which can be connected by an inner groove and led outward by a single passage connected to the sucking tubing 59; alternately the holes of row $a$ can be led outward independently, and each passage leads into its independent suction capillary tubing 59; finally the holes of the row $a$ and suction tubing 59 can be omitted when the filling up of particular loops 52 is effected after interruption of their connection to the holes of the row $b$ in the point 53.

The holes, or grooves of the rows $a, b, c, d, e, f$ can be connected successively by substantially V-shaped passages, shown in cross section in FIG. 5, which terminate in the surface of the valve spindle 50 in proper relation to the particular rows $a, b, c, d, e, f$. Thus the passage $g$ connects thereby the corresponding passages, or grooves $b$ and $c$, whereas the passage $h$ connects the grooves $d$ and $e$. It is obvious that the pump 57 in the position shown in FIG. 4, delivers the buffer through the groove $d$ over the passage $h$ into some of the holes $e$ and from there through the loop 52 into the passage $b$, which is connected by passage $g$ to the tubing 54 leading to the column 55. In this position, successively each of the loops 52 is inserted into the discharge flow of the pump 57. The total turning of the valve spindle 50 by one spacing is smaller than 180°, in other words smaller than one-half of one turning of the plug valve spindle 50.

During the continuing turning of said spindle 50, other connections among the passages $a, b, c, d, e, f$ are made. Connections effectuated by passage $i$ between the grooves $a$ and $b$, by passage $j$ between the grooves $c$ and $d$ and by passage $k$ between the grooves $e$ and $f$. All passages $i, j, k$ are located on the straight surface line of the valve spindle 50 opposite to that one, on which the ends of passages $g, h$ are lying. This is shown both on the longitudinal section in FIG. 5 and on the cross section shown in FIG. 4, in which the position of coinciding passages $g, h$, respectively $i, j, k$, is shown in the same way as in the developed circumference shown in FIG. 7. It is obvious that the connections effected by passages $i, j, k$ can be executed only in positions when passages $g$ and $h$ are ineffective. The passage $j$ (FIG. 6) creates then direct connection between the tubing 54, 56 and therefore a direct hydraulic connection from the pump 57 to the column 55. On the other hand, the passage $i$ connects successively the holes $b$ with holes or groove $a$ thus creating the successive connection of each of the loops 52, respectively of one of its end with the suction tubing 59. Analogically the channel $k$ creates successively a connection between the other end of particular loops 52, leading in the row of holes $e$, said holes $e$ being successively connected by passage *f* to the tubing 58, destined to the suction in of samples to the loops 52. Such suction of samples to the loops 52 can be carried out at any time, except when some of the reservoirs or loops 52 is about to be emptied into the column 55, to be thereafter washed out.

The grooves *a* and *f* can eventually be arranged on the whole circumference, contrary to the execution shown in FIG. 4, where said grooves, like grooves *e* and *d*, are shown only on one half of the inner circumference of the body 51. The grooves *c* and *d* can also be extended over the whole circumference while omitting of the passage *j*, in case said passage is substituted by a direct outer connection of tubing 56 and 54, by means of manual valve 60 (FIG. 5), which, by turning over 90° from the position shown, links the tubing 56 and 54. Said turning of the valve 60 can eventually be made dependent by an outer mechanism from the movement of the valve spindle 50 so as to avoid an interruption of the connection between tubings 56 and 54 in which case the pump 57 would produce such pressures, which could lead to the damage of the whole apparatus.

Passages *g, h, i, j, k* can be shaped instead of angular passages according to FIG. 5 as grooves worked out in the direction of the surface line, as schematically shown in FIG. 7.

If necessary, the replacing of grooves *c* and *d* can be replaced by a row of holes. The corresponding passages are in such case bored up to outer surface of the cylindrical body 51, where said passages are connected by a groove which, extends either over half of the circumference or over the whole circumference of the cylindrical body said groove is then tightly closed, by prestressed outer ring. From this circumferential groove leads through said ring only one passage to be connected to the outer tubing.

Figure 6:
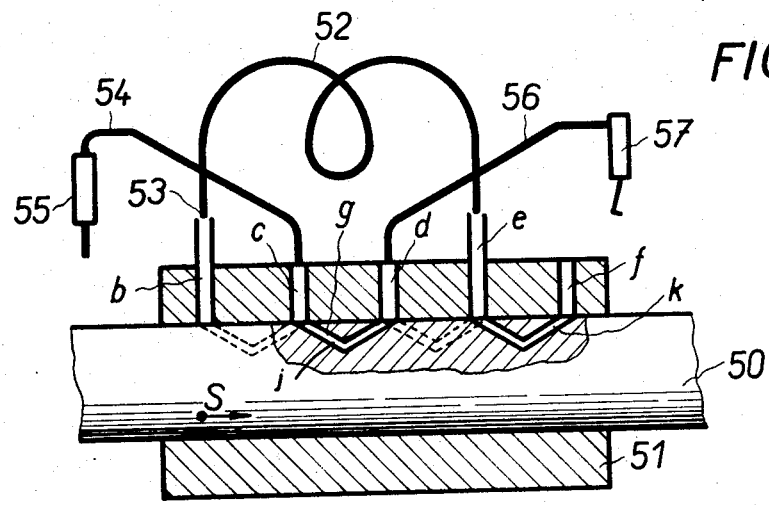

The function of the passages *i, j, k* according to the preceding description can be taken over by passages *g* and *h* if, according to FIG. 5, the valve spindle 50 is in the valve body 51 axially movable. FIG. 6 shows its position displaced by one spacing between passages *b, c, d, e, f*; thus passage *g*, which originally connected passages *b* and *c* and passage *h*, which originally connected passages *d* and *e*, as shown in dotted line in FIG. 6, are axially moved and passage *g* connects alternate and directly the passages *c* and *d* and, therefore, the tubings 56, 54; thus a direct connection of the pump 57 with the column 55 is effected, as shown in FIG. 6, in full lines.

In the execution according to FIG. 6, the suction passage *a* according to FIG. 4 can be omitted. If the function of said passage, connected to the tubing 59 according to FIG. 4, should be retained even in the alternative execution according to FIG. 6, another not shown connecting passage on the valve spindle 50 would be needed. The arrangement according to FIG. 6 has in comparison to the FIG. 5 not only the advantage of simplifying of passage system, but also the important advantage that the engagement of loops 52 is not restricted just to a half of the circumference. On the contrary, it is necessary, to ensure the precise axial displacement of said passages by one axial spacing when changing, from sucking to transferring samples from particular reservoirs into the column 55.

Figure 8:
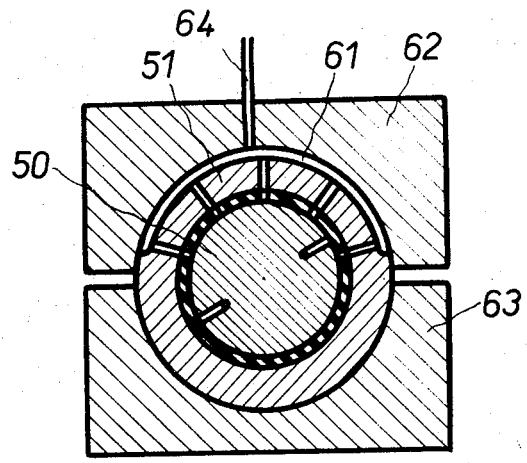
FIG. 8 shows a cross-sectional view of a modified embodiment of the distributing arrangement illustrated in FIG. 4.

FIG. 8 shows an alternative solution. As in the preceding case, the spindle 50 with grooves is situated in the solid body 51, lined by sealing packing, e.g., made of P.T.F.E., through which the passages pass as in the said preceding case. These passages are, however, leading into the groove 61, extending on less than one half of the outer surface of the body 51.

This groove 61 is closed from outside screwed, another body 62, which is either glued to the body 51, or the outer body 62 is attached, for example screwed, to the body 63 thus the space of the groove 61 is fully closed and the space of said groove 61 is outwardly connected just by passage 64 which may be a pressed-in hollow needle.

Figure 9:
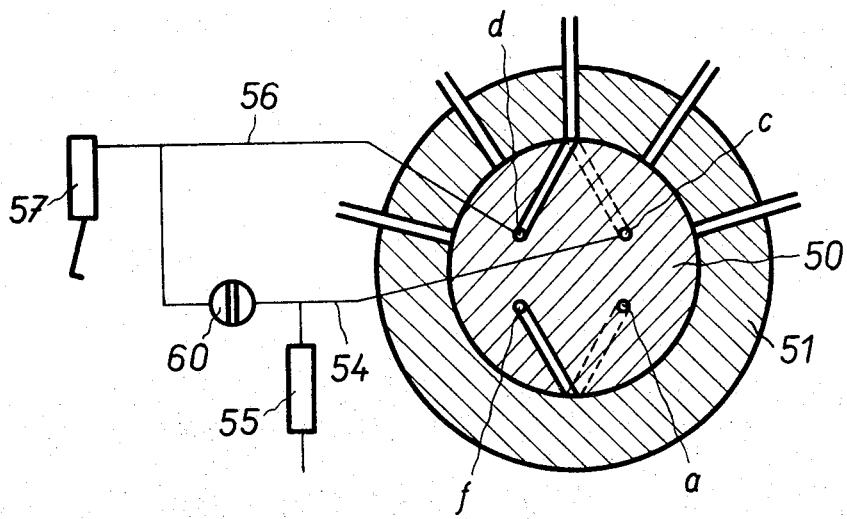
FIG. 9 shows a cross-sectional view of a simplified transfer arrangement.
Figure 10:
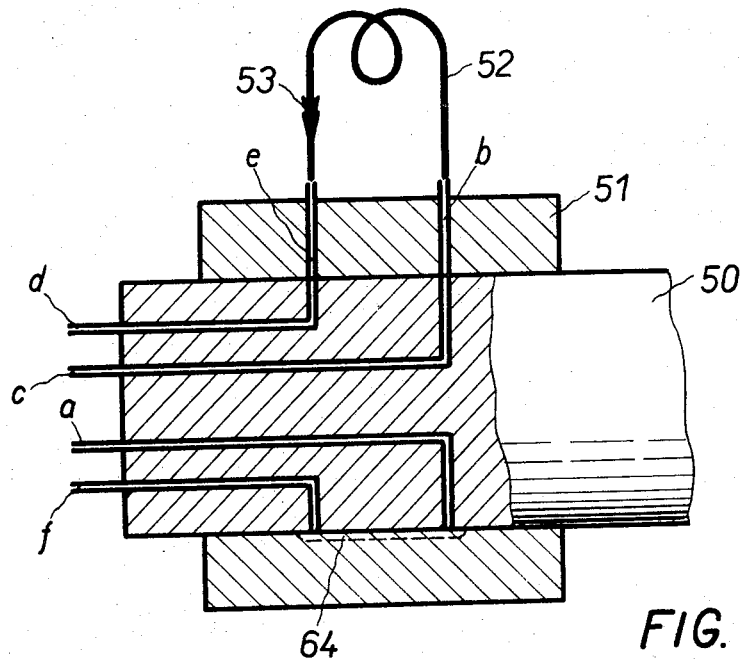
FIG. 10 is a longitudinal sectional view of the transfer arrangement shown in FIG. 8.

FIG. 9 shows schematically in cross section, and FIG. 10 in partial longitudinal section, an apparatus with the above-described function but with a substantially simplified passages system. Part of the outer hydraulic connections can be executed by connection to passages *a, c, d, f*, arranged in the spindle 50. This is enabled by the fact that the spindle 50 makes in the body 51 maximally one revolution only, such restriction effected by convenient stop means necessary to turn the spindle back so that the outer connection tubings are not twisted more than about ±180°. Such twisting can be allowed by using connections made from P.T.F.E. etc. The references used in FIG. 10 are the same as in the preceding figures to indicate conformity of functions. The substantial simplification consists in the absence of the continuous groove; the channels *c* and *d* lead directly into passages *e* and *b* leading to the particular loop 52.

Quite similarly are executed the connections to the passages *f* and *a*; if the loop 52 can be interrupted in the point 53 the channel *a* can be omitted. Then the mouths of passages *c, d, f* can be arranged on the front part of the rotatable spindle 50 in positions forming a triangle.

The need of direct connection of tubing 56 and 54 (FIGS. 9 and 10) is satisfied by turning the manual valve 60 into connecting position. Should said valve 60 be omitted, it would of course be necessary to arrange either on the inner surface of the body 51, longitudinal grooves 64, shown in FIG. 10 in dotted lines, or to provide passages, which connect the channels *c* and *d* when the passages *a* and *f* lead into the passages *e* and *h* during the period of filling of particular loops 52.

In FIG. 11 is shown in cross section, and in FIG. 12 in longitudinal section, schematically an alternative embodiment of the apparatus where the whole surface of the body 51 can be utilized for placing of passages *e* and *h*, leading to the particular loops; the valve spindle 50 has only two passages *c* and *d*, which are sufficient to fulfill all functions in case that they are connected to a further hydraulic switch 65, shown schematically with the corresponding flow ways in FIG. 10. The additional hydraulic switch 65 includes six exit throats in regular spacings, whereby any of two neighboring passages can be connected by means of one of three passages in a rotatable core member of the switch 65. Hydraulic switch 65 substitutes functionally the valve 60 shown in FIGS. 4 or 9 governing the connection between the tubings 54 and 56 and, therefore, also between the pump 57 and the column 55. In the position shown in FIG. 12, the tubing 56 of the pump 57 is connected to the tubing 66, which leads over the passage *c* to the passage *b* and therefore to the loop 52 and further over it through passage *e* and passage *d* and tubing 67 to the next throat of the switch 65, said throat connecting further to tubing 54 leading directly to the column 55, thus the flow way is closed over the loop 52 connecting to channels *e* and *b*, the hydraulic connection for said loop being effected by the momentary angular position of the valve spindle 50. This spindle 50 must be locked so as not to perform more than one revolution when connecting the tubings 66 and 67 directly onto the mouth of passages *c* and *d* of the rotatable spindle 50, in view of the limited possibility of twisting of flexible tubings 66 and 67. Otherwise it would be necessary to secure the said connection, e.g., by using circumferential grooves similarly as it has been described before, whereby the condition of limiting the rotating of the spindle 50 to less than one revolution could be neglected. The third passage of the distributor 65 connects in the position shown in FIG. 12 the suction tubing 68 leading to the suction equipment, here represented by the syringe 69 to the tubing 70. During the filling of the reservoir or washing out of the tubing, the receptacle 71 with the corresponding solution or sample is manually put in operational position so that the suction or cleaning by using of suction equipment 69 can be carried out.

If the rotatable core of hydraulic switch 65 is receptacle over one spacing, the connection of the peripheral passages is changed so that, besides the direct connection between the tubings 56 and 54, also the connection of suction tubing 68 to the tubing 67 and to the passage *d* is effected; the passage *e* is then connected with the loop 52 and the loop is sucked off over passages *b* and *c* through the tubing 66, to which the turned core of switch 65, connects the tubing 70, through which the sample, protective buffer, or separating bubble pistons can be sucked from the receptacle 71.

If the loop 52 is detachable in the point 53, in the manner described with reference to FIGS. 1 and 2, the tubing 70 can be omitted, and the suction is effected by directly placing the receptacle 71 onto the free mouth of the loop 52.

In this way it is possible to fill in or wash out the loop reservoirs or the corresponding tubings whenever during the chromatography, or thereafter, with the exception of a short time when the sample is transferred from any of the loops 52 into the column 55. Just for this short period the hydraulic switch 65 must be unconditionally in the position shown in FIG. 12. There are two ways of transferring the sample to the column 52. Either by turning of the valve spindle 50 over one angular spacing, namely the switching from the reservoir already emptied to the reservoir, to be emptied, the hydraulic switch 65 being preparatory, or at least simultaneously, brought into the position shown in FIG. 12. Or, the switch 65 is left to the last moment in the position corresponding to the possibility of sucking into the particular reservoirs, whereby the spindle 50 is in advance turned into the position connecting the passages $d$ and $c$ to the loop, from which the sample is to be transferred into the column 55. This transferring is then effected by actuating the switch 65. Besides the period needed for the transferring of the sample into the column 55 and the following washing out of the loop 52 and corresponding capillary tube, it is useful to keep the switch 65 in the position for filling up of the reservoirs, whereby the same are detached from any connection with the fluid flow, which is closed by means of one passage only, which connects directly the tubing 56 and 54.

It is sufficient that, even with a full automatic apparatus to turn, just the valve spindle 50 controlling the loops 52, over one spacing of the circumferential passages, during the period of one analysis. On the other hand, the hydraulic switch means 65 can just be turned manually before or after the new samples have been sucked into the particular loops 52. It is possible, of course, to turn also said other hydraulic switch 65 fully automatically, advantageously so that it is kept in the position ready for sucking in new samples into the loops 52, except for the short period when said switch 65 is turned into the other position, this occurring when each new sample from the loop 52 is transferred into the column at the beginning of a new analysis, eventually under short washing out of hydraulic flow ways. The resulting advantage is not only the fact that the manual operation of the switch 65 can be omitted and that the apparatus is practically always ready to suck in new samples into the reservoirs, but also the fact that the switching means of reservoirs is practically beyond the pressure flow of the pump and column, except for short periods of transferring particular sample into the column 52. Consequently, a smaller absolute tightness of the switch means of the reservoirs against higher pressures is required, this otherwise representing an extremely strict condition. While a slight untightness of the switch of the receptacles in their permanent inclusion into the pressurized hydraulic flow would result in an unadmissible leak, such connection will not be disturbing during the short periods of transfer of the samples, or in view of the imperfect ability to withstand permanent pressures.

The hydraulic switch 65 could be connected quite easily and with the same advantages mentioned with regard to FIG. 12 into the hydraulic flow to the switches of reservoirs according to other figures. Said switch 65 actually replaces the valve 60 with its mentioned advantages.

I claim:

1. In apparatus for transferring samples to a chromatographic column having a pump supplying buffer and eluent liquid to the column, and having a plurality of tubular containers for receiving samples before being transferred to the column, a sample inlet tubing and a waste tubing, and having a valve controlling flow in said apparatus, said valve comprising:

a body having an internal bore and having a plurality of said tubular containers spaced circumferentially around said body, each of said containers having inlet and outlet passages communicating with said bore and said passages being arranged in rows extending axially of said bore, each of said rows of passages being associated with a different container and being spaced circumferentially from adjacent rows of passages;

a plug mounted in said bore for rotation, said plug having a first row of V-shaped channels interconnecting axially spaced surface portions of said plug and having a second row of V-shaped channels interconnecting axially spaced surface portions of said plug, said second row of channels being spaced circumferentially from said first row of channels;

said inlet and outlet passages of said tubular containers being aligned with the respective inlet and outlet passages of adjacent tubular containers about the circumference of said bore, said column and said pump communicating with said bore at locations spaced axially from said inlet and outlet passages, said sample inlet tubing and said waste tubing communicating with said bore at other locations spaced axially from said inlet and outlet passages, and a plurality of axially spaced conduit means extending circumferentially between said plug surface and said bore, separate ones of said conduit means being aligned with said respective locations, said first row of V-shaped channels communicating between the inlet passage of one of said containers and through said conduit means from said pump through said tubular container to said column, and by changing the rotational position of said plug, communication is established through said second row of V-shaped channels and through said conduit means from said sample inlet tubing through said tubular container to said waste tubing, a first pair of said conduit means being spaced axially of said bore from said inlet and outlet passages a distance corresponding to the length of said V-shaped channels of said first row, the second pair of said conduit means being spaced from said inlet and outlet tubing a distance corresponding to the length of said V-shaped channels of said second row, said second row of V-shaped channels including a third channel having a length corresponding to the distance separating said conduit means of said first pair, said column and said pump communicating with said first pair of conduit means, said sample inlet tubing and said waste tubing communicating with said second pair of conduit means, whereby rotating said plug to align said first row of channels with one of said tubular container passages conducts a sample in said container from said second row of channels while said tubular container introduces another sample into said container.

2. The apparatus according to claim 1 wherein said conduit means extending between said first and second rows of passages includes circumferential grooves, said grooves being coextensive with said rows of passages, whereby alignment of said first plug row with said first and additional passage rows communicates through said V-shaped channel between said tubular containers and said pump and said column.

3. The apparatus according to claim 1 wherein said V-shaped conduits of said first plug row are arranged in alternate relation between said V-shaped conduits in said second row, whereby said spaced locations on said plug surface of both of said plug rows are in substantially radial alignment, whereby rotation of said plug displaces said V-shaped channels into alignment with the respective pairs of passages.

* * * * *